(12) United States Patent
Bucchieri et al.

(10) Patent No.: US 12,548,433 B2
(45) Date of Patent: Feb. 10, 2026

(54) PREDICTIVE SYSTEM AND METHOD FOR SAFETY IN THE WORKPLACE

(71) Applicant: ADAM AI SOLUTIONS S.R.L., Milan (IT)

(72) Inventors: Danilo Bucchieri, London (GB); Michele Villa, Fremantle (AU)

(73) Assignee: ADAM AI SOLUTIONS S.R.L., Milan (IT)

( * ) Notice: Subject to any disclaimer, the term of this patent is extended or adjusted under 35 U.S.C. 154(b) by 81 days.

(21) Appl. No.: 18/263,530

(22) PCT Filed: Jul. 9, 2021

(86) PCT No.: PCT/IB2021/056194
§ 371 (c)(1),
(2) Date: Jul. 29, 2023

(87) PCT Pub. No.: WO2022/162443
PCT Pub. Date: Aug. 4, 2022

(65) Prior Publication Data
US 2024/0087444 A1   Mar. 14, 2024

(30) Foreign Application Priority Data

Jan. 29, 2021   (IT) .................. 102021000001961

(51) Int. Cl.
*G08B 31/00*     (2006.01)
*G08B 21/02*     (2006.01)
(Continued)

(52) U.S. Cl.
CPC ............. *G08B 31/00* (2013.01); *G08B 21/02* (2013.01); *G08B 25/016* (2013.01); *G16Y 20/10* (2020.01); *G16Y 40/10* (2020.01); *G16Y 40/50* (2020.01)

(58) Field of Classification Search
CPC ................... G16Y 40/10; G08B 31/00; G06Q 10/063114; G06Q 10/0833; G06Q 10/0639; Y02P 90/80; G06N 20/00; G06N 5/04
See application file for complete search history.

(56) References Cited

U.S. PATENT DOCUMENTS

2020/0174517 A1   6/2020   Martinez et al.
2020/0202281 A1*  6/2020   Barak ..................... G06F 21/84
(Continued)

FOREIGN PATENT DOCUMENTS

EP           3276554 A1      1/2018

OTHER PUBLICATIONS

International Search Report and Written Opinion, mailed Nov. 8, 2021, European International Search Authority, from PCT/IB2021/056194.

*Primary Examiner* — Mirza F Alam
(74) *Attorney, Agent, or Firm* — Workman Nydegger

(57) ABSTRACT

A predictive system and method for the safety of subjects in a workplace. The system may include wearable devices, each being configured to detect and transmit an identification code and physical magnitudes representative of vital values, IoT sensors, positioned within the work environment to be monitored and configured to transmit an identification code and first parameters characteristic of the work environment, a knowledge base including occupational accident-type models that each include a set of data which contribute to a calculation of risk factors, and a computer unit configured to process occupational risk data that includes an input module configured to receive said identification code and said physical magnitudes and said identification code and first parameters characteristic of the work environment. The system further includes a risk calculation module configured
(Continued)

to determine an accident risk profile of a subject based on an Artificial Intelligence model.

10 Claims, 2 Drawing Sheets

(51) Int. Cl.
*G08B 25/01* (2006.01)
*G16Y 20/10* (2020.01)
*G16Y 40/10* (2020.01)
*G16Y 40/50* (2020.01)

(56) References Cited

U.S. PATENT DOCUMENTS

| | | | | |
|---|---|---|---|---|
| 2020/0242525 | A1* | 7/2020 | Zaslavsky | G06N 7/01 |
| 2022/0036302 | A1* | 2/2022 | Cella | G06N 20/00 |
| 2023/0031942 | A1* | 2/2023 | Shrestha | G01S 5/14 |
| 2023/0402187 | A1* | 12/2023 | Kumar | G16H 50/30 |

* cited by examiner

PREDICTIVE SYSTEM AND METHOD FOR SAFETY IN THE WORKPLACE

TECHNICAL FIELD

The present invention relates to a predictive system and method for the safety of a plurality of subjects in the workplace.

In particular, the system and the method are used for a dynamic risk profiling (called "PRESTO"—PREdictive Safety TOol) which, starting from structured and unstructured data relating to companies, workers, environmental conditions, allows the workers themselves and their managers to make decisions in the context of carrying out particularly dangerous tasks.

PRIOR ART

The proposed invention is part of the techniques for the prevention of the damages to the health of subjects operating in the workplaces.

Since the national regulations relating to prevention in the workplaces are very complex and burdensome (in Italy the Consolidated Law on the safety in the workplaces—Legislative Decree 81/08), various software and management systems have been developed over the years.

Some of them deal with ordinary management, limiting themselves to recording the data collected and using this data to make plannings.

In the following description, the working environment is understood to mean both a "closed" work environment, such as for example, offices, warehouses, factories, industrial sheds and the like, and "open" environments, such as construction sites, electric energy and gas transmission networks, data transmission networks, etc.

The term subject also refers to an operator or worker of a company or a user of the system.

Despite undoubted progress has been made in recent years for the prevention and reduction of accidents, the numbers remain intolerably high. Think, for example, of the construction sector in Italy: despite a decline in the number of accidents (source INAIL) partly due to the economic contraction, their severity and mortality rates remain at too high levels, generating dramatic situations for the families involved and leading to excessive costs for the society and the companies themselves. The situation can be extended to all industrial sectors. It seems that in recent years a plateau has been reached in the reduction of accidents as represented by the curves relating to the "Total Recordable Injury Frequency Rate" (TRIFR) at a global level; new techniques and tools are needed to improve the performance and save discomfort and unproductive costs. For the companies, these costs stem from legal fees, insurance and compensation costs, worker recovery costs, worker replacement costs, process review, plant closures during investigations, etc., not to mention the costs linked to reputation. By way of example, in America it has been estimated that the average cost of an electrocution accident is about $ 250,000 including direct and indirect costs.

The primary company function to which this invention is addressed is the HSE function, (structured on several levels depending on the size of the company) which, by law in many jurisdictions, has a figure equivalent to the one that in Italy is the Responsible for the Service of Protection and Prevention (RSPP). The RSPP has a primary interest in reducing accidents and is the subject responsible for assessing and managing the related risks.

CEOs and other managers and supervisors have direct responsibility for the health and safety of the workers. The issues of environment, health and safety together with social issues are now an integral part of growth strategies, because they involve all aspects of interaction with internal and external stakeholders in companies that can no longer be ignored. They require new solutions. While other tools have been used for years for the purpose of safety management, also considering a very in-depth legislation, companies are struggling to improve on these aspects.

Typically, the companies rely on management systems made up of instructions and procedures that workers are expected to follow scrupulously. In reality this does not necessarily happen and it is necessary to leverage individual behaviours to improve attention and safety risk management.

At the state of the art, the involvement of workers in reporting risks can take place manually, for example through interviews or filling in forms, or through dedicated digital applications.

The limits of these methods of reporting by workers are as follows:
  the reports are made on a voluntary basis;
  the reports are affected by the subjectivity of the worker, who can choose to report some risks and omit others (perhaps higher);
  the report can easily be traced back to the identity of the reporting worker, who could therefore adopt a reticent behaviour in order not to compromise the solidarity relationship with the reported person.

Other known solutions provide for greater automation in the collection of reports, through the installation of sensors that are wearable (wearables) by the workers, through which it is possible to detect the passage through gates, the presence of workers in some company areas, the actual use of personal protective equipment, etc.

Even in this case, however, each wearable sensor is uniquely linked to a worker, who is often afraid of the consequences of his report.

The prior art only apparently solves the problem of detecting the risks of accidents in the workplace.

In concrete business situations, despite the presence of a huge base of available information, it remains impossible to collect complete information on work activities and interactions between workers, plants and work environments.

Furthermore, there are always privacy limits and prohibitions on the control of the workers' activities.

Object of the Invention

The technical task at the basis of the present invention is to propose a predictive system for the safety of a plurality of subjects which overcomes the aforementioned drawbacks of the prior art.

In particular, the object of the present invention is to provide a predictive system and method for the safety of a plurality of subjects in the workplace that allows companies to reduce the number of incidents, accidents and fatal outcomes.

A further object of the present invention is to provide a predictive system and method for the safety of a plurality of subjects in the workplace which, by acting as a decision support tool based on risk profiles, allows improving company performance in the accident field, through a reduction in accident indicators (for example TRIFR).

Another object of the present invention is to allow a drastic reduction of average costs linked to accidents and incidents in the workplace.

A further object of the present invention is to reduce the likelihood of negative events and to allow the creation of a shared safety culture by acting on its individual behaviours.

Another object of the present invention is to allow the workers themselves and their managers to make decisions in the context of carrying out particularly dangerous tasks.

A further object of the present invention is to provide a predictive system and method for the safety of a plurality of subjects in the workplace that is in real time and efficient.

The present invention helps companies to reduce the number of incidents, accidents and fatal outcomes by responding to a primary need of the community to preserve human health and life and to allow workers to return home safe and sound at the end of work.

Furthermore, the present invention allows, by acting as a decision support tool based on risk profiles determined in real time, improving the company performance in the accident field, by reducing the accident indicators (for example TRIFR). In addition to the imaginable effects on the health and well-being of the workers and their families, using the system of the present invention, companies can demonstrate an increase in attention with respect to the expectations of the workers, of the legislator, of the organizations responsible for health surveillance and the control of safety in the workplaces.

At the same time, through a better risk management, they meet the needs of the shareholders in preserving company sustainability and increase the public perception of their reputation. This, in addition to the savings resulting from the lost costs mentioned above.

In a first aspect of the invention, the aforementioned objects are achieved by a predictive system for the safety of a plurality of subjects in the workplace comprising:
  a plurality of wearable devices, each of which being configured to detect and transmit a first identification code and one or more physical magnitudes representative of the vital values of the wearer;
  a plurality of IoT sensors, positioned within the work environment to be monitored and configured to transmit an identification code and one or more first parameters characteristic of the work environment;
  a knowledge base comprising a plurality of occupational accident-type models, each accident-type model comprising a set of data which contribute to the calculation of risk factors;
  a computer unit configured to process occupational risk data comprising:
    an input module configured so as to receive:
    from said plurality of wearable devices, said first identification code and said one or more physical magnitudes representative of the vital values of the wearer;
    from said plurality of IoT sensors, said second identification code and one or more first parameters characteristic of the work environment;
      a risk calculation module configured to determine an accident risk profile of a subject based on an Artificial Intelligence model, in particular a Machine Learning and Alternative Data Management model.

In a second aspect of the invention, the aforesaid objects are achieved by a predictive method for the safety of a plurality of subjects in the workplace comprising:
  detecting and transmitting a first identification code and one or more physical magnitudes representative of the vital values of the wearer by means of a plurality of wearable devices;
  transmitting an identification code and one or more first parameters characteristic of the work environment by means of a plurality of IoT sensors, positioned within the work environment to be monitored;
  preparing a knowledge base comprising a plurality of occupational accident-type models, each accident-type model comprising a set of data which contribute to the calculation of risk factors;
  receiving, from said plurality of wearable devices, said first identification code and said one or more physical magnitudes representative of the vital values of the wearer;
  receiving from said plurality of IoT sensors, said second identification code and one or more first parameters characteristic of the work environment;
  determining an accident risk profile of a subject based on an Artificial Intelligence model, in particular a Machine Learning and Alternative Data Management model.

BRIEF DESCRIPTION OF THE DRAWINGS

Further characteristics and advantages of the present invention will more fully emerge from the indicative, and therefore non-limiting, description of a preferred but not exclusive embodiment of a predictive system for the safety of a plurality of subjects in the workplace, as illustrated in the accompanying drawings, in which.

DETAILED DESCRIPTION OF PREFERRED EMBODIMENTS OF THE INVENTION

Figure 1:
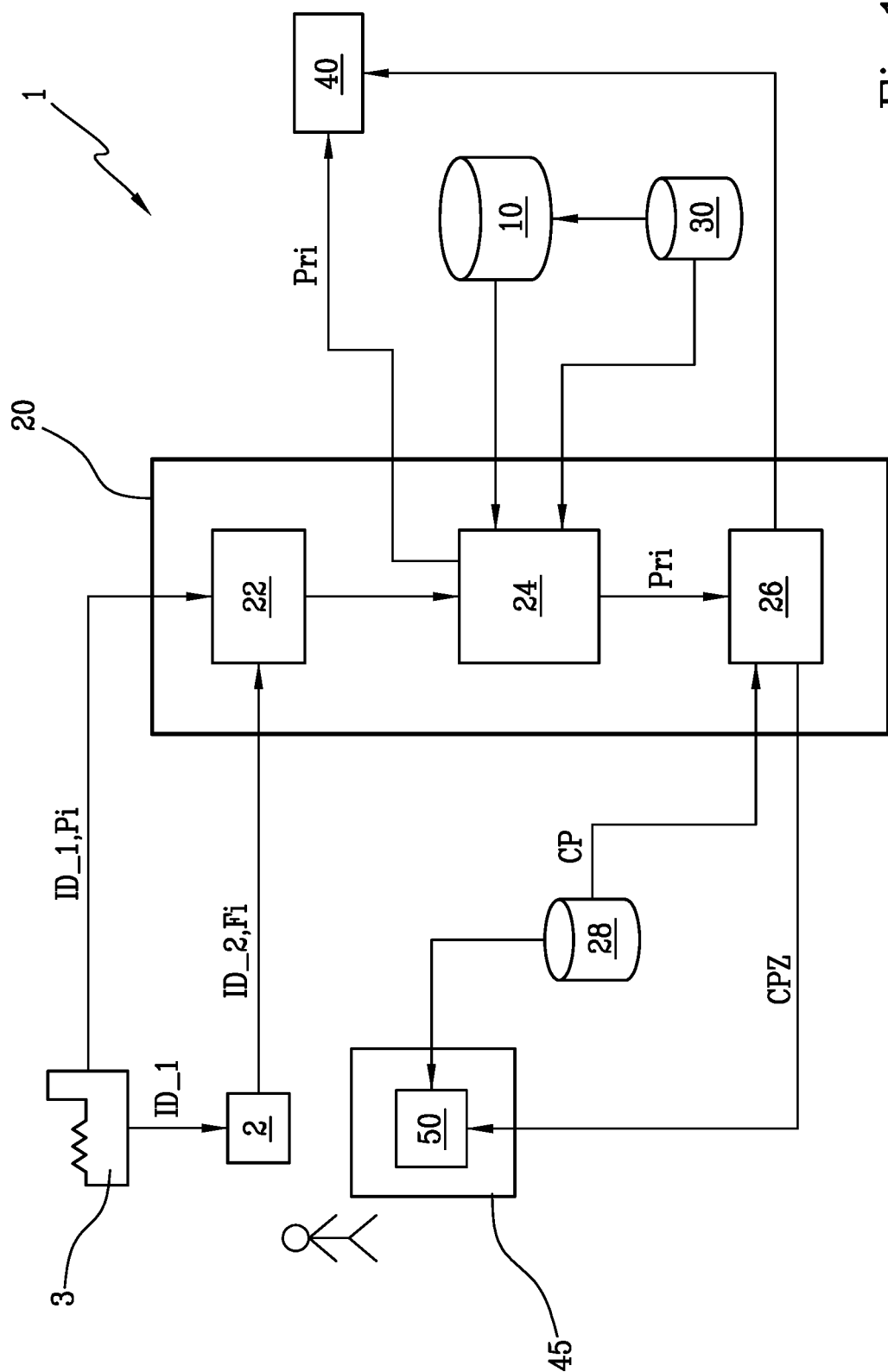
FIG. 1 schematically illustrates the block diagram of the predictive system, in accordance with the present invention.

In a first aspect, the present invention describes a predictive system 1 which comprises a plurality of wearable devices 2, a plurality of environmental sensors 3, which for simplicity's sake in the following present description will be referred to as "IoT sensors" ("Internet of Things"), a knowledge base 10 and a computer unit 20.

Each wearable device 2, also known as wearable, can comprise at least one sensor, configured to detect one or more physical magnitudes Fi.

According to one embodiment, each wearable device 2 comprises several sensors, configured to detect different physical magnitudes Fi.

The sensors can be, for example, an accelerometer, a gyrometer, a magnetometer, an altimeter, a body temperature sensor, an oximeter, a heart rate detector, a heart rate variability (HRV) detector, a meter of the composition of the sweat, a pedometer, a breathalyser, a dosimeter configured to detect individual exposure to ionizing radiations.

The wearable devices 2 can be of the same type or be different depending on the activities that the subjects must perform and the work environments in which they must operate.

For example, a vehicle driver may have a breathalyser, a subject operating in an X-ray room, a dosimeter, etc.

For example, some are wearable on the wrist, others on the belt, etc. Each wearable device 2 is configured to receive a first unique identification code ID_1 transmitted by one or more environmental sensors 3 that are located within a predefined range, for example within 4-6 meters.

Optionally or in addition, the first unique identification code ID_1 can be transmitted directly to the input module 22.

The wearable device 2 is also configured to transmit a first structured data item (also called record Rn) to a server or to the computer unit 20, comprising at least:
- the first unique identification code ID_1 received;
- one or more parameters Pi characteristic of the measurement of one or more magnitudes of the workplace to be monitored;
- a first unique identification code ID_2 of the wearable device 2;
- the physical magnitude or physical magnitudes Fi detected;
- a progressive number n.

In particular, the progressive number n identifies the records of a table. The first record therefore has a plurality of fields, but it can have more thereof based on the readings made by the sensors on board the wearable device 2.

In particular, in the case of a three-axis accelerometer and three-axis gyrometer, six measurements are taken in total, so a record will consist of nine fields, i.e. the six measurements M1, M2, M3, M4, M5, M6, the first unique identification code ID_1, the second identification code ID_2 and the relative progressive number n.

Figure 2:
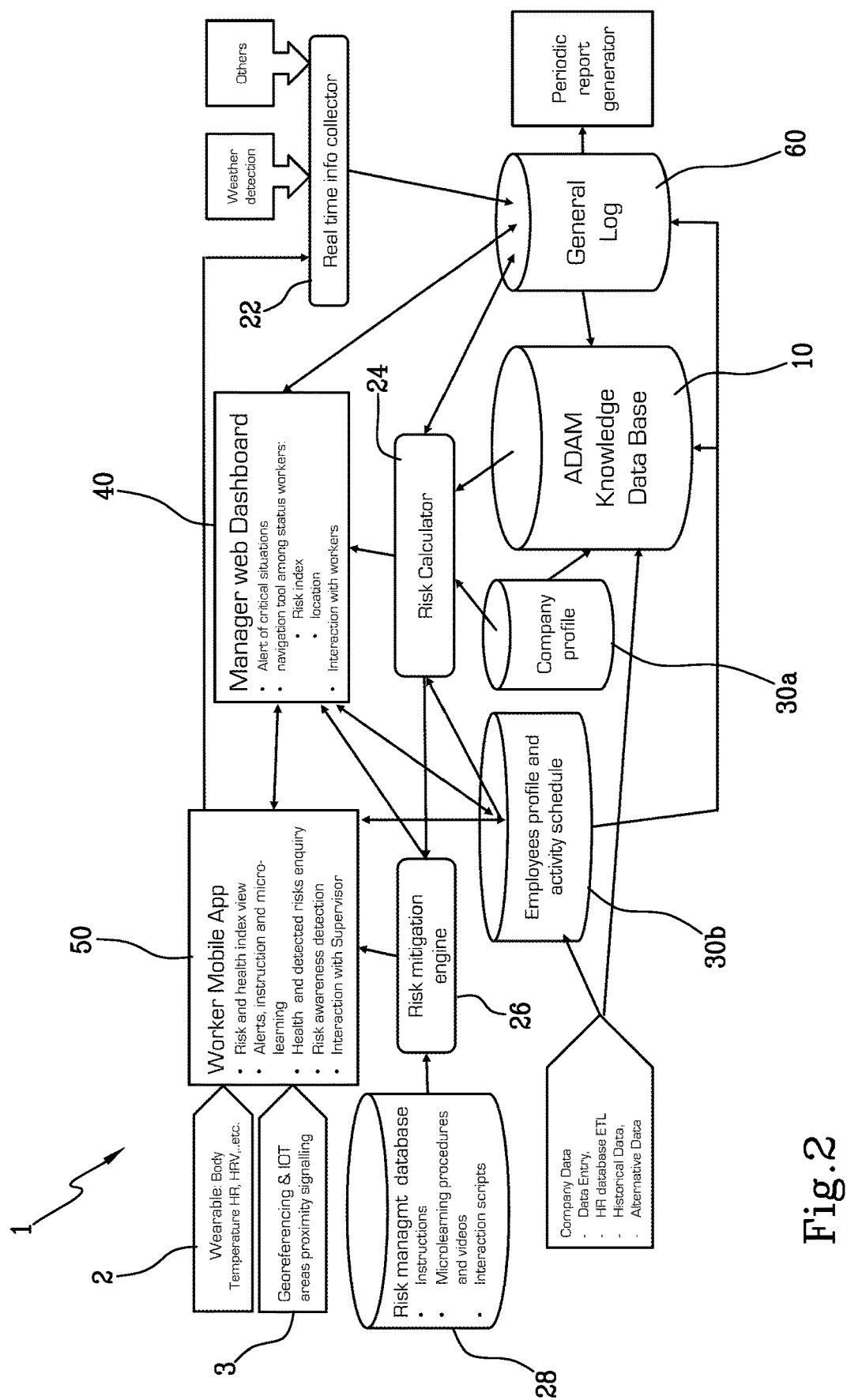
FIG. 2 illustrates a predictive system, according to the present invention.

For example, each wearable device 2 sends a certain predetermined number of records per second wirelessly to a first server or to the computer unit 20 or to a log database 60 (FIG. 2). A first database of records is thus stored on the log database 60.

Each environmental sensor 3 is located in a corresponding station, zone or work area, preferably in a fixed position, and is configured to transmit its unique identification code ID_1, which will be referred to below as the "first identification code" to distinguish it from the second identification code. Each environmental sensor 3 is also configured to transmit one or more parameters Pi characteristic of the measurement of one or more magnitudes of the workplace to be monitored as they affect the risk of accidents.

According to one aspect of the invention, each environmental sensor 3 is a beacon comprising a battery, an electronic circuit and an antenna. The beacon is a code emitting device of a known type, based on Bluetooth Low Energy (BLE) technology.

The number of environmental sensors 3 depends on the desired position resolution, which in turn depends on the level of privacy agreed with the subjects (workers) of the system 1.

However, it is essential that each be available to a plurality of subjects, so as to avoid being used as an identification device.

The quantity and type of environmental sensors installed depends on the particularity of the environments of the workplaces in which the subjects operate.

For example, if the workplace is a hospital, near environments where there is equipment that can emit ionizing radiations, there will be at least one detector of such radiations.

If, for example, the workplace to be monitored is a factory, the environmental sensors 3 will monitor temperatures, humidity, ventilation, any presence of toxic gases, sound pressure level, vibrations, which may be present in the various areas of the factory.

In the situation of outdoor workplaces, the environmental sensors 3 used will also be configured to measure weather conditions, which can affect the risk of accidents.

The system 1 also comprises a knowledge base 10 comprising a plurality of occupational accident-type models, each accident-type model comprising a set of data which contribute to the calculation of risk factors.

The knowledge base 10 is the heart of the system 1 according to the present invention and is implemented by means of an abstraction process which allows not intervening heavily with the writing of an additional or different code during the process of mapping data relating to the typical accidents of each company. To do this, the knowledge base 10 will be structured as follows:
- An accident-type model is defined and for this model the information that represents it is defined;
- This information is encoded in terms of data type, size and range of values it can assume;
- The system, for each model, will be able to dynamically build the insertion interfaces.

In the face of the model that describes the type of accident, it is possible to define sets of data that can be taken into consideration for the calculation of risk factors by the risk calculation module 24, taking into account data and information of different origins.

The way in which these data are used and the process for connecting them in order to make them contribute to the calculation of the risk profile is to be evaluated based on the needs of the calculation engine.

Typically it will be a question of defining models that select a set of references to the data, selected in the knowledge base 10 on the basis of their characteristics, to be submitted as input parameters to the calculation module; this returns the calculated value (risk profile) based on the parameters it has taken into consideration (input+any significant data resulting from the calculation phases, set of errors).

"References to data item" refers to the names of the fields that contain the homogeneous information necessary for processing. If the information is not homogeneous, it will be standardized. This activity is done by attributing to the model, for each type of information requested, the type (or types) of data item that can be taken into consideration. If instead the tables are structured in a traditional way, the selection will be made by directly selecting the names of the fields.

The system 1 comprises a computer unit 20 configured to process occupational risk data. In particular, the computer unit 20 comprises:
- an input module 22 configured so as to receive:
  - from said plurality of wearable devices 2, said second identification code ID_2 and said one or more physical magnitudes Fi representative of the vital values of the wearer;
  - from said plurality of IoT sensors 3, said first identification code ID_1 and one or more first parameters Pi characteristic of the work environment;
  - a risk calculation module 24 configured to determine an accident risk profile Pri of a subject based on an Artificial Intelligence model, in particular a Machine Learning and Alternative Data Management model.

In general, it should be noted that in the present context and in the subsequent claims, the computer unit 20 is considered to be divided into distinct functional modules (memory modules or operating modules) for the sole purpose of describing the functionalities thereof clearly and completely.

Such computer unit can consist of a single electronic device, appropriately programmed to perform the functionalities described, and the different modules can correspond to hardware entities and/or routine software that are part of the programmed device.

Alternatively, or in addition, these functions can be performed by a plurality of electronic devices over which the aforesaid functional modules can be distributed.

The computer unit 20 can further make use of one or more processors for executing the instructions contained in the memory modules.

The risk calculation module 24 examines the models obtained through the analysis of the data present in the knowledge base 10 and takes care of acquiring the information that the model requires in order to calculate the degree of risk that the execution of the activity assigned to the operator can represent. Typically:
- it takes into account the profile of the worker in terms of personal characteristics, skills, experience, training received, etc.;
- it receives information deriving from the Mobile Apps of the wearables 2 with which the operator is provided, including where possible native applications for smartphones or tablets;
- it analyses the data relating to the scenario in which the operator carries out the activity (weather conditions, analysis of the workplace, systems and equipment present), where possible through geolocation;
- it requests information from the user himself through a questionnaire or proactively receives it from the user. This last operation is carried out with the aid of a risk reduction module 26 ("Risk Mitigation Engine") and the answers acquired through the input module 22 ("Real Time Info Collector"). This activity ends with the definition of a risk profile Pri and the communication of what is necessary to the operator by communicating it to the risk reduction module 26 and to the controllers by communicating it to a graphic command interface or company dashboard 40 ("Manager Web Dashboard").

The calculation models used by the risk calculation module 24 are based on the application of Artificial Intelligence techniques and methodologies and in particular of Machine Learning and Alternative Data Management.

Each subject can be equipped with a personal electronic device 45, comprising a graphic interface 50 configured to display various types of information, even in an aggregate manner, received from the wearable devices 2, from the IoT sensors 3, from the risk reduction module 26, from the database containing the profile of the subjects and the activities to be carried out, other information from the graphical command interface 40.

The system comprises a company information database 30 comprising one or more of the following archives:
- company profile 30a;
- subject profile 30b, including personal data, physical characteristics, level of preparation, accident history and other information;
- activities to be carried out by type of subject associated with the risk profile 30b thereof;
- average frequency of each activity carried out;
- description of the work environments and the risk profile thereof;
- database of accidents and near misses.
- alternative risk data, such as, for example, other data and information relating to factors that may contribute to the risk, which are not traditionally considered;
- database of all the data collected by all the wearable devices 2 and by the IoT sensors 3 of the plurality of subjects and environments and all the activities carried out.

In accordance with an embodiment, the computer unit 20 comprises a risk reduction module 26 configured to:
- receive from said risk calculation module 24 said risk profile Pri associated with a given subject;
- select one or more preparatory contributions CP for the performance of a given activity and send them to the subject's personal electronic device 45. The risk reduction module 26 is configured to receive inputs from the risk calculation module 24 and, based on the risk profile Pri received, send information to the operator in terms of preparatory contributions CP (video tutorials, documents, etc.) for a correct performance of the activity, by consulting a risk management database 28 containing videos, procedures and interaction scripts that are administered as a function of the characteristics of the worker, of his task, of the context and of the level of risk, from the risk reduction module 26.

The risk management database 28 contains the tables that associate risk triggers, specific operational situations with information resulting in the actions to be taken, such as: videos, tutorials, messages, actions to be performed.

The company figures in charge will produce "microlearning" videos (max 90 seconds) that will make up the library of customized documents on the company to be sent to the subject.

Based on the result of the risk calculation Pri (risk profile) and on the information relating to the activity carried out and the profile of the subject carrying out the activity, the module takes care of selecting which CPs to send to the operator.

The activities that the risk reduction module 26 must carry out include an interaction with the subject which is also necessary to receive information directly from the field of action. This operation involves sending simple questionnaires to be filled in by the subject or return communications from the same. The risk reduction module 26 communicates decisions made by the controller to the subject. It sends information on the risk profile Pri and more to the graphical command interface 40.

For example, said one or more preparatory contributions for the performance of a given activity (CP) include one or more of at least:
- a short video tutorial;
- technical documentation;
- voice or text messages;
- information on actions to be taken;
- sequence of questions whose answers will be analysed in order to perceive what is necessary to determine the subject's ability to continue operating.

In other words, the risk management database 28 is configured to select one or more preparatory contributions for the performance of a given activity CP and to send them to the personal electronic device 45 of a given subject based on the accident risk profile Pri, the activity carried out and the profile of the subject.

In accordance with an embodiment, the risk reduction module 26 is further configured to send information on the risk profile Pri to a graphic control interface 40 configured to display essential performance indicators to a controller; and to generate an alert message to be sent to the subjects at high risk of accident.

Some non-limiting examples of first parameters Pi characteristic of the work environment comprise:

proximity sensors adapted to identify the subject's position;

sensors capable of detecting the brightness of the work environment;

sensors capable of detecting sound pressure and vibration levels;

sensors capable of detecting the presence of dust or gases in the work environment, preferably gases such as carbon monoxide, radon, toxic gases;

sensors capable of detecting the temperature and humidity of the work environment;

meteorological sensors, preferably configured to measure barometric pressure, wind speed.

The personal electronic device 45 comprises a tablet computer, a smartphone, a smartwatch, a laptop or similar.

In a second aspect, the present invention describes a predictive method for the safety of a plurality of subjects in the workplace comprising the steps of:

detecting and transmitting a first identification code ID_2 and one or more physical magnitudes Fi representative of the vital values of the wearer by means of a plurality of wearable devices 2;

transmitting a second identification code ID_1 and one or more first parameters Pi characteristic of the work environment by means of a plurality of IoT sensors 3, positioned within the work environment to be monitored;

preparing a knowledge base 10 comprising a plurality of occupational accident-type models, each accident-type model comprising a set of data which contributes to the calculation of risk factors;

receiving, from said plurality of wearable devices 2, said first identification code ID_2 and said one or more physical magnitudes Fi representative of the vital values of the wearer;

receiving, from said plurality of IoT sensors 3, said second identification code ID_1 and one or more first parameters Pi characteristic of the work environment;

determining an accident risk profile Pri of a subject based on an Artificial Intelligence model, in particular a Machine Learning and Alternative Data Management model.

The system can comprise a log database 60 configured to store all the data detected by all the wearable devices 2 of the plurality of subjects, by the IoT sensors 3 present in the workplace and by all the activities carried out by the subjects.

The communication methods between the various devices of the system 1 include at least UWB, BLE, WIFI, 2/3/4/5G, NBIoT, LORA and similar.

As a person skilled in the art can easily understand, the invention allows overcoming the drawbacks highlighted above with reference to the prior art.

In particular, the present invention allows improving the safety of a plurality of subjects in the workplace which allows companies to reduce the number of incidents, accidents and fatal outcomes.

It is clear that the specific features are described in relation to different embodiments of the invention with an exemplary and non-limiting intent. Obviously a person skilled in the art can make further modifications and variants to the present invention, in order to satisfy contingent and specific needs. For example, the technical features described in relation to an embodiment of the invention can be extrapolated therefrom and applied to other embodiments of the invention. Such modifications and variations are moreover embraced within the scope of protection of the invention as defined by the following claims.

The invention claimed is:

1. A predictive system for safety of a plurality of subjects in a work environment, the predictive system comprising:

a plurality of wearable devices, each of which being configured to detect and transmit a first identification code and one or more physical magnitudes representative of vital values of a wearer;

a plurality of IoT (Internet of Things) sensors, positioned within the work environment being monitored and configured to transmit an identification code and one or more first parameters characteristic of the work environment;

a knowledge base comprising a plurality of occupational accident-type models, each occupational accident-type model comprising a set of data that contributes to a calculation of risk factors;

a computer unit configured to process occupational risk data comprising:

an input module configured to receive:

from said plurality of wearable devices, said first identification code and said one or more physical magnitudes representative of the vital values of the wearer; and from said plurality of IoT sensors, said second identification code and one or more first parameters characteristic of the work environment; and a risk calculation module configured to determine an accident risk profile of a subject based on an artificial intelligence model including a Machine Learning and Alternative Data Management model;

wherein the risk calculation module examines the occupational accident-type models obtained through the analysis of the data present in the knowledge base and takes care of acquiring information that the artificial intelligence model requires to calculate the accident risk profile;

wherein the information that the artificial intelligence model requires are information deriving from the plurality of wearable devices and from the plurality of IoT sensors.

2. The predictive system according to claim 1, further comprising a personal electronic device assigned to each subject comprising data characteristic of the subject and a graphical interface.

3. The predictive system according to claim 1, further comprising a company information database comprising one or more of the following archives:

company profile;

subject profile;

activities configured to be carried out by type of subject associated with the risk profile thereof;

average frequency of each activity carried out;

description of the work environments and the risk profile thereof;

database of accidents and near misses;

alternative risk data, database of all the data collected by all the wearable devices and by the IoT sensors of the plurality of subjects and environments and all the activities carried out.

4. The predictive system according to claim 2, wherein the computer unit comprises a risk reduction module configured to:

receive from said risk calculation module said risk profile associated with a given subject; and select one or more preparatory contributions for the performance of a given activity and send them to the subject's personal electronic device.

5. The predictive system according to claim 4, wherein said one or more preparatory contributions for the performance of a given activity comprise one or more of:
   a short video tutorial;
   technical documentation;
   voice or text messages;
   information on actions;
   sequence of questions whose answers will be analysed in order to perceive what is necessary to determine the subject's ability to continue operating.

6. The predictive system according to claim 4, further comprising a risk management database configured to select said one or more preparatory contributions for the performance of a given activity and send them to a certain subject based on the accident risk profile, the activity carried out and the subject's profile.

7. The predictive system according to claim 4, wherein said risk reduction module is further configured to:
   send information about the risk profile to a graphical control interface configured to display essential performance indicators to a controller; and
   generate an alert message configured to be sent to high accident risk subjects.

8. The system according to claim 1, wherein said one or more first parameters characteristic of the work environment comprise:
   proximity sensors adapted to identify the subject's position;
   sensors capable of detecting the brightness of the work environment;
   sensors capable of detecting sound pressure and vibration levels;
   sensors capable of detecting the presence of dust or gases in the work environment, preferably gases such as carbon monoxide, radon, toxic gases;
   sensors capable of detecting the temperature and humidity of the work environment;
   meteorological sensors, preferably configured to measure barometric pressure, wind speed.

9. The system according to claim 2, wherein said personal electronic device comprises:
   a tablet computer;
   a smartphone;
   a smartwatch;
   a portable PC.

10. A predictive method for the safety of a plurality of subjects in the workplace comprising:
   detecting and transmitting a first identification code and one or more physical magnitudes representative of vital values of a wearer by means of a plurality of wearable devices;
   transmitting a second identification code and one or more first parameters characteristic of the work environment by means of a plurality of IoT sensors, positioned within the work environment being monitored;
   preparing a knowledge base comprising a plurality of occupational accident-type models, each accident-type model comprising a set of data which contribute to the calculation of risk factors;
   receiving, from said plurality of wearable devices, said first identification code and said one or more physical magnitudes representative of the vital values of the wearer;
   receiving, from said plurality of IoT sensors, said second identification code and one or more first parameters characteristic of the work environment;
   wherein the risk calculation module examines the occupational accident-type models obtained through the analysis of the data present in the knowledge base and takes care of acquiring the information that the model requires calculate the risk profile;
   wherein the information that the model required are information deriving from the plurality of wearable devices and from the plurality of IoT sensors.

* * * * *